Jan. 31, 1956  S. PINTO  2,733,180
METHOD OF PRINTING ON PLASTIC FILMS
Filed Feb. 28, 1952  4 Sheets-Sheet 4
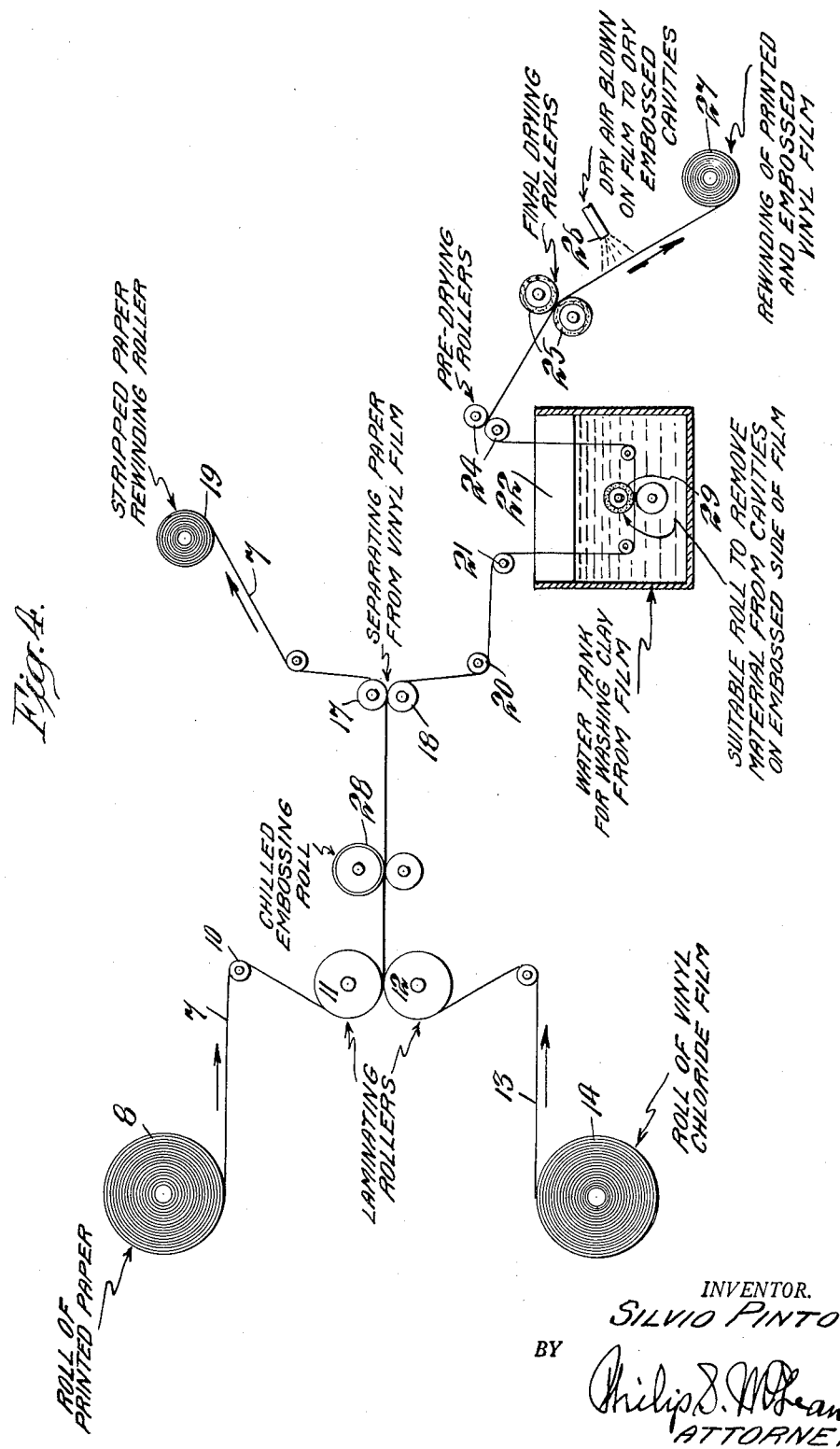
INVENTOR.
SILVIO PINTO
BY
Philip S. M'Lean
ATTORNEY

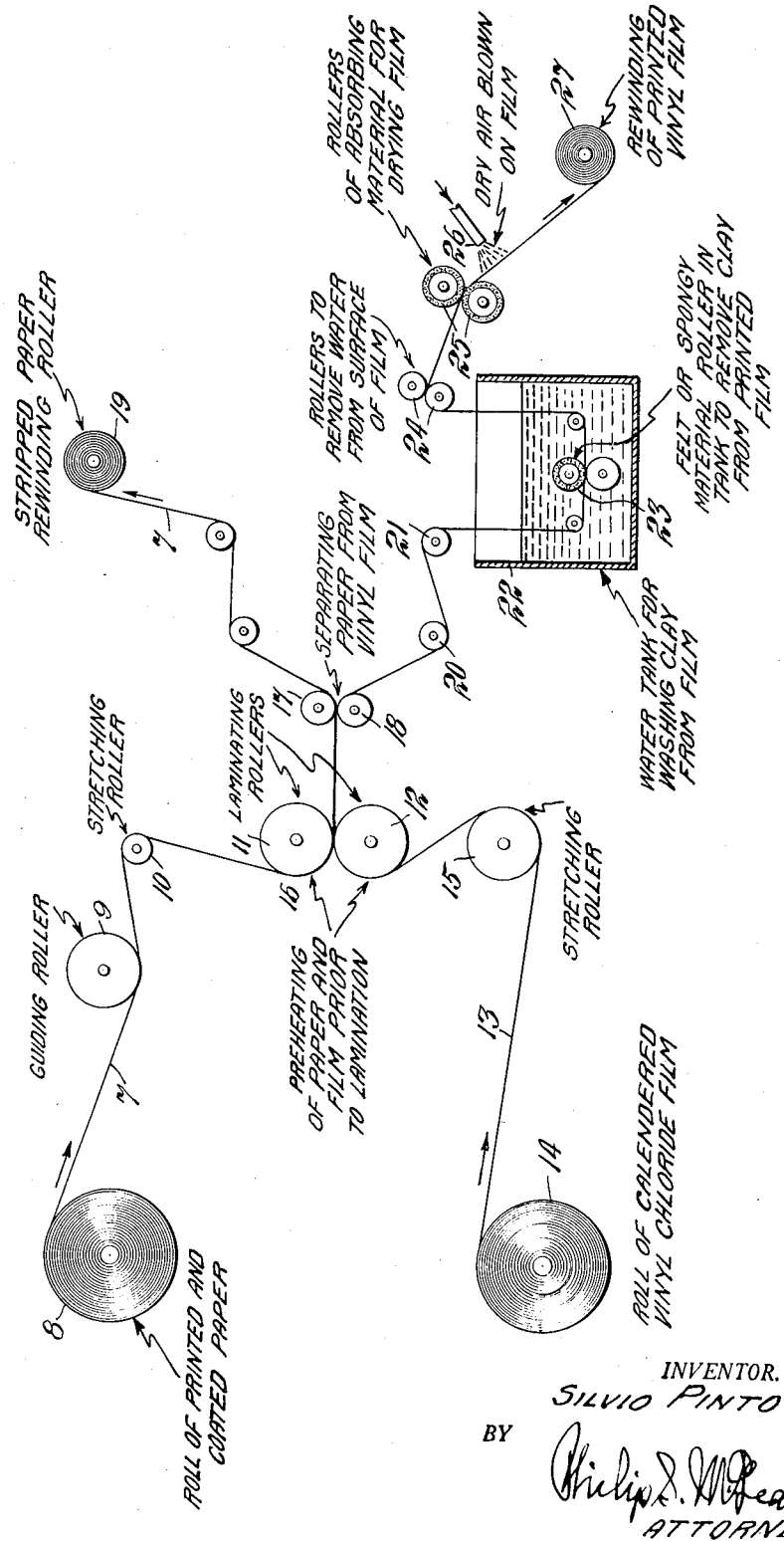

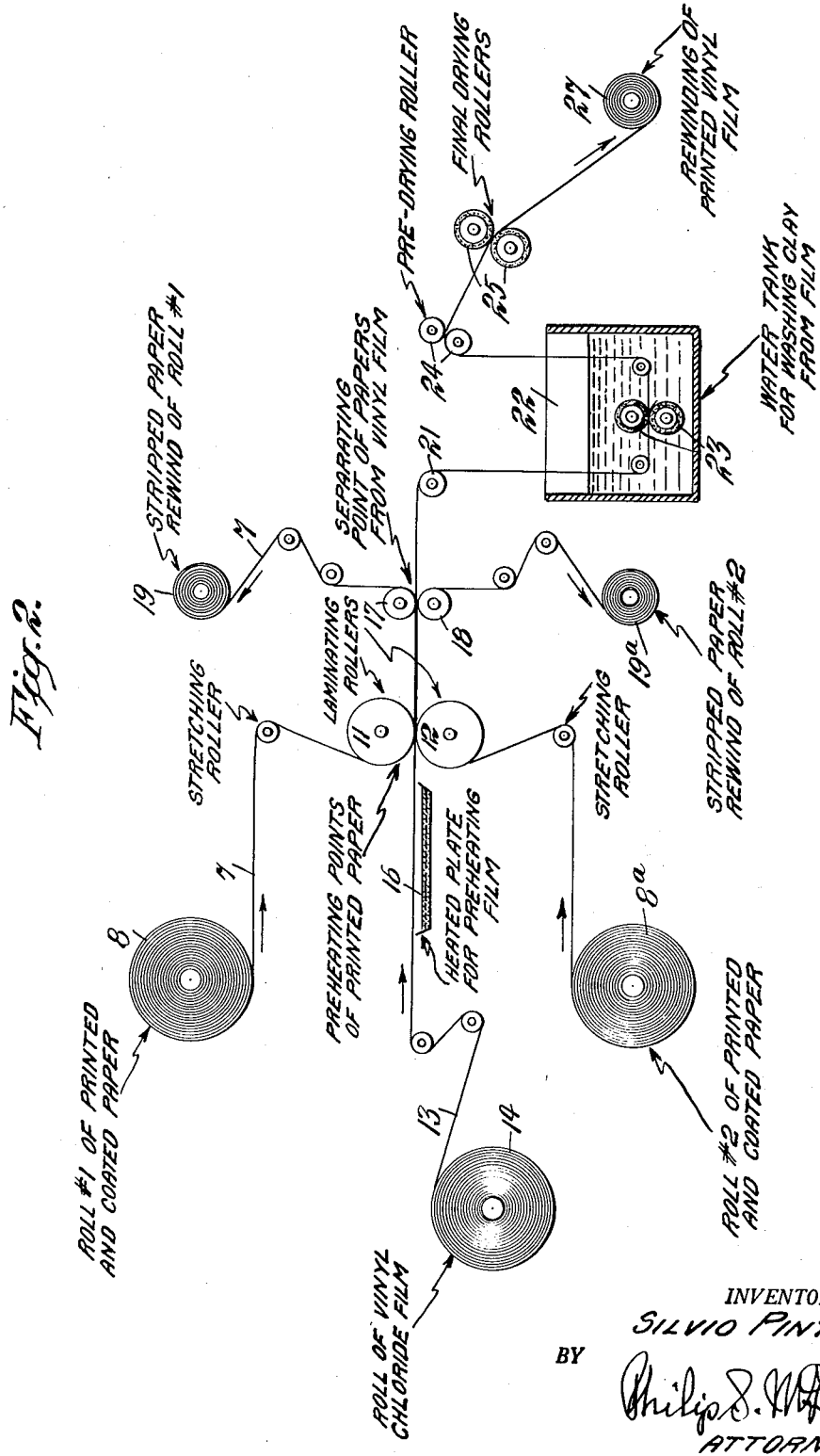

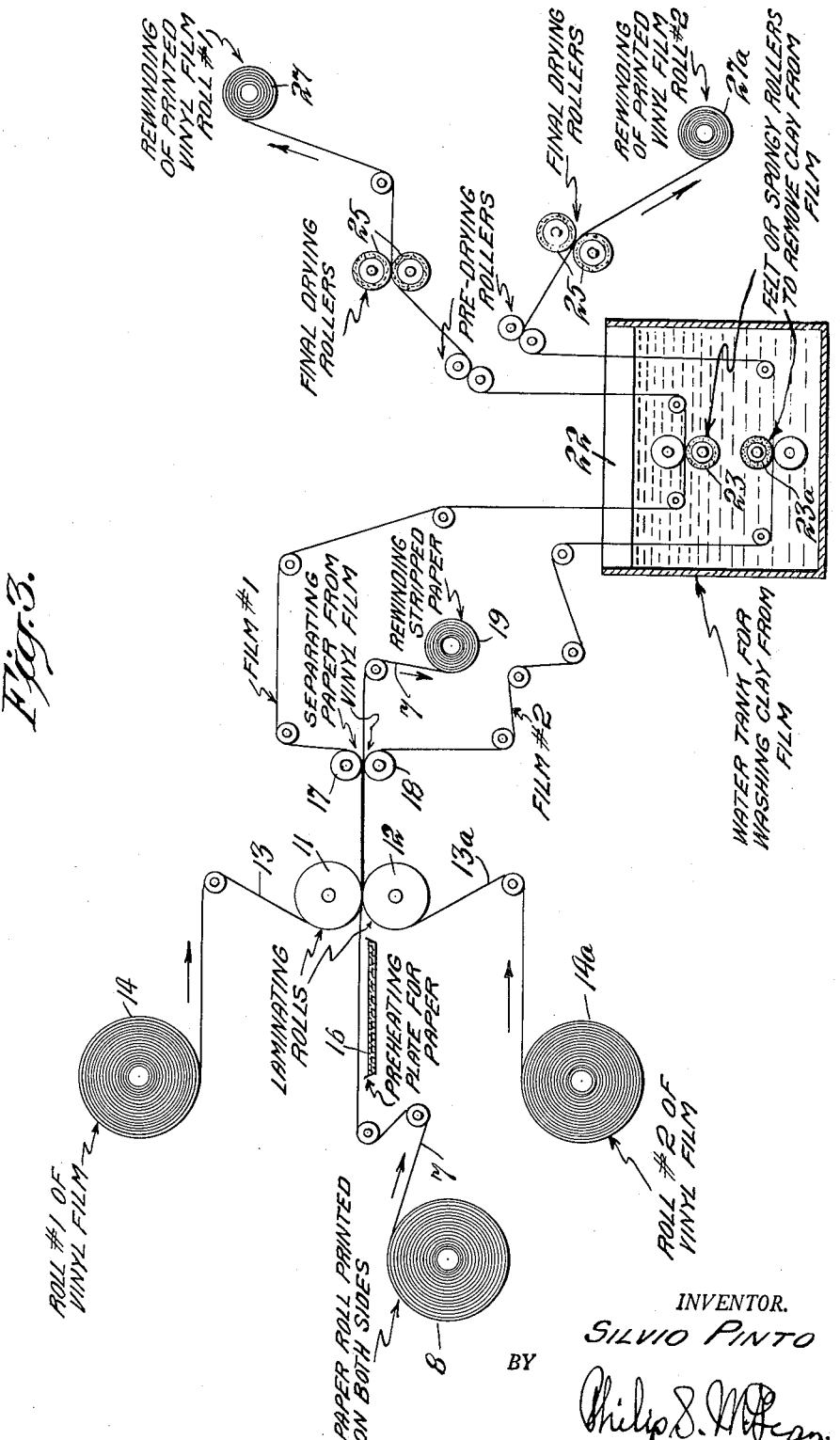

United States Patent Office 2,733,180
Patented Jan. 31, 1956

2,733,180
METHOD OF PRINTING ON PLASTIC FILMS

Silvio Pinto, Long Island City, N. Y.

Application February 28, 1952, Serial No. 273,803

8 Claims. (Cl. 154—95)

The difficulties of printing on plastics of the polyvinyl chloride type are well known. Among these may be mentioned the limited number of colors that can be applied at one time, the poor registration and the diffusion of colors, the need to use expensive special vinyl base inks and the lack of permanency resulting from such surface printing.

Objects of the present invention are to overcome difficulties or faults such as mentioned and to effect the printing on plastics in unlimited colors, with accurate registration, using regular printing inks and utilizing all the brilliance and beauty accomplished with such inks in the printing trade.

Special objects of the invention are to attain on the plastics all the detail that can be accomplished in the lithographic, offset and other approved fine printing processes and additionally, to incorporate this with the plastic in a way which will give it long lasting wearing qualities, a great advantage in products utilitarian in character, such as shower-bath curtains, wearing apparel and the like, to which the invention is particularly adapted.

Further special objects of the invention are to accomplish all the foregoing and related objects with simple, practical procedure and apparatus, low cost and speedy operation.

Other desirable objects attained by the invention and the novel features constituting the invention are set forth and will appear in the course of the following specification.

The drawings accompanying and forming part of the specification illustrate various ways of carrying out the invention, but it will be appreciated that structure and procedure may be modified and changed, all within the true intent and scope of the invention as hereinafter defined and claimed.

Briefly considered, the invention involves the printing in colors or in black and white and by any approved printing methods, on coated paper, and the transfer then of this print, which may be highly artistic in character, to the face of the vinyl chloride or other such plastic after first coating the print with a resin compatible with the plastic, the transfer being effected under heat and pressure and the clay or other coating medium of the paper being washed away to leave the face of the plastic clean, with the print in its original state permanently impregnated therein.

Fig. 1 in the drawings is a diagrammatic illustration showing the invention carried out as a continuous process for transfer of a design from paper printed on one side, to one side of a plastic film;

Fig. 2 is a similar view illustrating transfer of printed matter from two separate rolls of paper to both sides of the film, such as to simulate a through design;

Fig. 3 is a diagrammatic representation illustrating transfer of design from paper printed on both sides onto two separate vinyl films;

Fig. 4 is a diagrammatic illustration of transfer of printed design from paper to film, and embossing.

In carrying out the invention a desired pattern, design or photographic reproduction is printed as by methods now used for high class magazines, on clay-coated or paper otherwise treated to prevent the inks from penetrating into the fibre and to insure transfer of approximately 100% of the inks in the design and brilliancy of the original colors.

This is also to assure easy separation of the paper, after lamination with vinyl film, and the 100% washing away of the surface clay which may come away from the paper with the print.

This, furthermore, preferably will insure the paper being stripped dry so that it may be used over again for the same or different purposes.

Particularly important is the fact that the coated paper does not let the inks or the coating material which is used to effect the transfer, penetrate into the paper fibre and makes it easy to strip, on the application of heat, in the laminating press.

The paper may vary in thickness, those now used for high-speed, continuous printing purposes being found suitable to the present invention.

The inks should be non-blending or such types as now used and that can be coated over without discoloring or streaking.

After printing, the surface is coated, as by conventional coating means such as roller coating, spraying, brushing or scraping.

Preferably machine roller coating is employed with a drying oven for speeding up removal of solvents from the coating.

A coating solution that is most effective for complete transfer and compatibility with polyvinyl chloride film, may be prepared as follows:

Dissolve the resins gradually by high-speed agitation in the solvents to prevent lumping.

*Copolymer vinyl chloride resin—VMCH or VYHH*

20.0—VMCH resin
39.6—methyl isobutyl ketone
39.6—toluol or toluene
0.4—propylene oxide
0.4—n-butyl acid phosphate or maleic acid After the resin has completely dissolved to a water-clear solution the mixture may be filtered to remove any possible residue.

A small proportion of plasticizers may be added by taking about a pint or more of the original mixture and dissolving in it from ½ to 2% of dioctyl phthalate (di-2-ethylhexyl phthalate) and not more than ¼ to ½% of KP-120 (methoxyglycol-acetyl rinoleate). After complete dispersion this plasticizer addition may be combined with the original solution, with agitation, and after standing five or ten minutes the coating material is ready for use.

In above example the proportions given are by volume.

After applying the coating material over the printed paper design and drying, the transfer may be effected as follows:

The coated side of the printed design is placed next to the vinyl film and the two are subjected to heat and pressure in a laminating press or run through laminating rollers.

The applied heat may be on the order of 150° F. and the pressure on the order of 600 to 1,000 pounds per square inch.

The heat and pressure may be increased in accordance with thickness of paper and plastic film and should be sufficient to insure adhesion of the coating to the film.

If a strip type of paper is used this may be removed while still warm, or after being chilled, according to character of such paper.

If, on the other hand, a paper is used that has to be soaked for removal, any of the various ways of facilitating such removal may be employed, and the clay coating can be washed off at the same time.

After the paper and clay coating are completely removed the film is dried on both sides, using any convenient drying method and making sure no moisture is left on the film which might cause a puckering effect.

After drying, the film may be rewound if on a continuous roll, or laid flat if in sheets.

In the different transfer methods illustrated, Fig. 1 shows how the design printed on one side of the paper may be applied to one side of a plastic film.

Specifically the paper 7, printed on one side, is run from a roll 8 over guiding and stretching rollers 9, 10, to laminating rollers 11, 12, where it meets the calendered vinyl chloride film 13 running from roll 14 over stretching roll 15.

Prior to actual lamination the printed paper and plastic film may be preheated by any usual or special means, at 16, or heating may be effected entirely by the laminating rollers which constitute the laminating press. After the lamination is accomplished the paper and film are separated at the rollers 17, 18, and the stripped paper guided to a rewinding roller, at 19.

The plastic film with the printed design impregnated therein is guided from the separating rollers 17, 18, over rollers 20, 21, into a washing tank 22 containing water which will wash the clay from the surface of the film.

To insure complete removal of the clay, a felt or sponge roller 23 may be provided in the tank, located to act on the impressed side of the film.

Rollers are shown provided at the exit of the tank, at 24, to remove water from the surface of the film.

Drying rollers of suitable blotting material are shown provided at 25, and drying air may be blown on the film at 26, before rewinding the finished film at 27.

Fig. 2 shows apparatus arranged to transfer prints from two separate rolls of paper 8 and 8a, to opposite sides of the same film.

In this case the laminating rolls 11, 12, impress and incorporate the printed designs into both faces of the film passing between the same, and the two layers of paper are stripped at the rolls 17, 18, from opposite faces of the film and rewound on separate rolls 19, 19a.

The designs may be registered on opposite sides of the film or may be entirely unrelated, as desired, and the film, passing through the tank, may be acted on by washing rollers 23, 23, on both sides.

Fig. 3 illustrates a variation in which designs printed on both sides of paper 7 from roll 8 are laminated separately, but at the same time, to the plastic films 13, 13a, running from rolls 14, 14a.

In this case there is only one rewinding roll, 19, of stripped paper, but the washing tank is equipped with guiding and washing rollers for the two separate films, and with drying equipment and rewinding rolls 27, 27a, for the two separate films. The washing rollers for the two separate films are designated 23 and 23a.

Fig. 4 shows how embossing or other such operations may be effected as a part of the transfer operations.

In this illustration the operation is substantially the same as in Fig. 1, with the addition of an embossing roll or rollers 28 between the laminating and separating rollers, and with a sponge rubber or other such roll 29 provided in the washing tank for cleaning material from the embossed cavities in the film.

The present invention, it will be seen, makes it possible to reproduce on vinyl films and the like, all the coloring and detail that it is possible to obtain with the finest methods of printing on paper. The transfer of the print from the paper to the film is an actual impregnation, as distinguished from mere surface printing, and making the printing practically a permanent part of the plastic. The compatibility of the coating aids in this impregnation and permanence of results and the retention of the inks by the film.

The relatively low heat used in the lamination does not impair or objectionably affect either the inks or the plastic.

The process makes possible the use of ready formed and cured vinyl films and calendered, cast or scrape coated types of all thicknesses and grades. These films may be supported or unsupported. The short time of contact does not affect the brilliancy of the inks as originally printed and the process does not require the use of vinyl base inks, though these in some cases may be used to advantage.

The process, particularly in the continuous film forms illustrated, may be performed at a reasonably rapid rate and at low cost.

While the original subject matter printed on paper may be made up especially for transfer to the plastic film, it will be realized that practically any paper printed matter may be utilized, at any time following the paper printing operation.

By the term "dry" as employed herein and in the appended claims in connection with the coated paper, it is intended to mean that the resin coating is in a dry, non-tacky state. This is clearly manifested in Figs. 1–3 of the drawings wherein such coated paper is shown as wound on rollers.

What is claimed is:

1. The method of printing on a polyvinyl resin plastic comprising providing a design printed on paper, said paper so treated to prevent the inks from penetrating into the fiber of the paper, applying a resin solution compatible with said polyvinyl resin plastic over the design, drying the resulting coating to a dry, non-tacky state, laminating the coated over design on the paper to the polyvinyl resin plastic under heat and pressure, and then separating the paper from the plastic.

2. The method of printing on a polyvinyl resin plastic comprising providing a design printed on paper, said paper so treated to prevent the inks from penetrating into the fiber of the paper, applying a resin solution compatible with said polyvinyl resin plastic over the design, drying the resulting coating to a dry, non-tacky state, laminating the coated over design on the paper to the polyvinyl resin plastic under heat and pressure, separating the paper from the plastic, washing and then drying the plastic.

3. A method in accordance with claim 1 in which the lamination of the coated over design on paper on the plastic is performed under heat at a temperature of about 150° F. and at a pressure between about 600 and about 1,000 lb. per square inch.

4. The method of printing on a polyvinyl resin plastic comprising providing a design printed on paper, said paper so treated to prevent the inks from penetrating into the fiber of the paper, applying a resin solution compatible with said polyvinyl resin plastic over the design, drying the resulting coating to a dry, non-tacky state, laminating the coated over design on the paper to the polyvinyl resin plastic under heat and pressure, separating the paper from the plastic, and removing the original coating material of the paper left impressed on the plastic by the laminating step.

5. The herein disclosed method of printing on a polyvinyl resin plastic film, comprising providing a design printed on paper, coating over the printed design on the paper with a resin solution compatible with plastic resin film, drying the coating to a dry, non-tacky state, laminating the coated-over design on paper to the plastic film under heat and pressure, embossing the laminated film, separating the paper from the film and then cleaning material from the embossed cavities of the film and drying the embossed, cleaned film.

6. The herein disclosed method of printing on polyvinyl chloride film, comprising providing a design printed on paper, coating over the printed design on the paper with a copolymer vinyl chloride resin solution, drying the coating to a dry, non-tacky state, laminating the coated paper to the film under heat and pressure, separating the paper from the film and then washing and drying the film with the design impressed therein.

7. The herein disclosed method of printing on polyvinyl chloride film, comprising providing a design printed on paper, coating over the printed design on the paper with a copolymer vinyl chloride resin solution including approximately 20% resin, 39.6% methyl isobutyl ketone, 39.6% toluol, 0.4% propylene oxide, 0.4% n-butyl acid phosphate and a small proportion of plasticizer, drying the coating to a dry, non-tacky state, laminating the coated paper to the film and then separating the paper from the film.

8. The method of claim 1, in which the paper carrying the printed design is a clay-coated paper and in which traces of the clay coating left on the plastic in the laminating step and not removed by separation of the paper from the plastic, are subsequently removed by washing the plastic.

References Cited in the file of this patent

UNITED STATES PATENTS

| | | |
|---|---|---|
| 2,092,928 | Moody et al. | Sept. 14, 1937 |
| 2,404,073 | Karfiol et al. | July 16, 1946 |
| 2,510,750 | Marquardt | June 6, 1950 |
| 2,532,941 | Rado | Dec. 5, 1950 |
| 2,571,962 | Smith et al. | Oct. 16, 1951 |
| 2,627,485 | Smith | Feb. 3, 1953 |
| 2,627,486 | Smith | Feb. 3, 1953 |

FOREIGN PATENTS

| | | |
|---|---|---|
| 562,573 | Great Britain | July 6, 1944 |